United States Patent [19]

Buck

[11] 3,779,552

[45] Dec. 18, 1973

[54] AUDIBLE GAME

[75] Inventor: Gordon H. Buck, Torrance, Calif.

[73] Assignee: Mattel, Inc., Hawthorne, Calif.

[22] Filed: Dec. 16, 1971

[21] Appl. No.: 208,668

[52] U.S. Cl. ................ 273/88, 273/94 R, 274/42 R

[51] Int. Cl. ................................................ A63f 9/00

[58] Field of Search .................. 274/1 A, 9 B, 42 R, 274/42 P, 14; 273/135 A, 142 K, 138 R, 85 R, 88, 93 R, 94 R; 40/340; 35/8 A; 46/175 AR

[56] References Cited

UNITED STATES PATENTS

| | | | |
|---|---|---|---|
| 3,331,144 | 7/1967 | Hahn | 35/8 A X |
| 3,532,348 | 10/1970 | Sloop et al. | 35/8 A UX |
| 3,666,274 | 5/1972 | Fox et al. | 274/9 B |
| 3,510,966 | 5/1970 | Golden et al. | 274/1 A X |
| 3,529,832 | 9/1970 | Goetz et al. | 274/1 A |
| 936,976 | 10/1909 | Berliner | 40/340 X |
| 2,703,241 | 3/1955 | Abramson | 274/42 R |

FOREIGN PATENTS OR APPLICATIONS

| | | | |
|---|---|---|---|
| 323,951 | 1/1930 | Great Britain | 273/142 K |
| 539,492 | 9/1941 | Great Britain | 274/9 B |
| 931,901 | 11/1947 | France | 273/138 R |
| 460,311 | 1/1937 | Great Britain | 273/142 K |
| 589,154 | 12/1959 | Canada | 274/9 B |

*Primary Examiner*—Anton O. Oechsle
*Assistant Examiner*—Harry G. Strappello
*Attorney*—Seymour A. Scholnick

[57] ABSTRACT

A simulated football game or other strategy game, wherein the opposing strategy of two players is employed to select phonograph record tracks. Each track includes a voice recording which sounds like a sports announcer describing a play based on the strategies of the opposing teams, and describing the outcome of the play. The offense player selects one of several records, each record having a label describing a different offensive strategy, and inserts the record into a phonograph so that the defensive player cannot see the label. The record has several markings spaced thereabout indicating different defensive strategies, and the defense player turns the record until a chosen defensive strategy is opposite a pointer on the phonograph housing. The phonograph then plays a record track describing the outcome of the play. The leadin portions of the record tracks are arranged about the record so that if the defense player has selected a highly appropriate strategy, a track is likely to be played that describes an outcome favorable to the defense, while an inappropriate defense strategy selection is likely to result in playing a record track describing an outcome unfavorable to the defense.

1 Claim, 12 Drawing Figures

INVENTOR
GORDON H. BUCK

BY [signature]

ATTORNEY

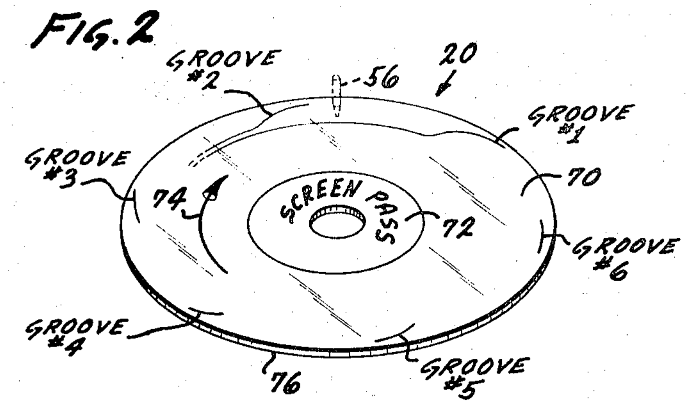
FIG. 2

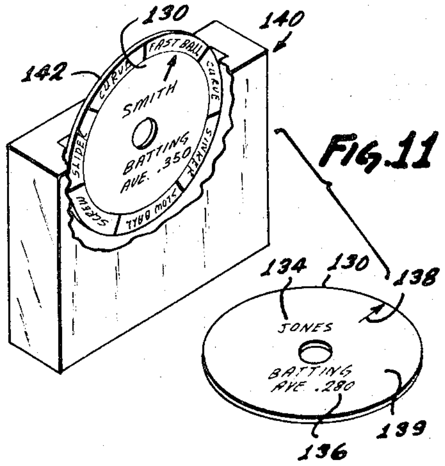
FIG. 11

FIG. 4

| PLAY | GROOVE #1 | GROOVE #2 | GROOVE #3 | GROOVE #4 | GROOVE #5 | GROOVE #6 |
|---|---|---|---|---|---|---|
| SCREEN PASS | COMPLETE 8 YARDS | NO GAIN | PASS FULLBACK 25 YARDS | NO GAIN | SCREEN LEFT 16 YARDS | SCREEN MIDDLE 7 YARDS |
| OFF TACKEL | FULLBACK RUN LOSS 2 | HALFBACK RUN GAIN 3 | HALFBACK UP MIDDLE GAIN 11 | FULLBACK BIG HOLE GAIN 7 | HALFBACK SPINS FALL GAIN 4 | GAIN 10 PENALTY |
| SHORT PASS | PASS GAIN 12 PENALTY | PASS END GAIN 15 | TACKLED LOSS 3 | PASS INTERCEPT | PASS HALFBACK NO GOOD | SWING PASS FULLBACK 10 YARDS |
| Q.B. OPTION | PASSES TOUCHDOWN | KEPTS NO GAIN | PASS 15 YARDS | PASS NO GOOD | PASS FLANKER 20 YARDS | OUT OF BOUNDS LOSS 5 |
| END SWEEP | POWER SWEEP 2 YARDS | LOSS 8 FUMBLE | SWEEP RIGHT 10 YARDS | SWEEP LEFT 6 YARDS | OUT OF BOUNDS 7 YARDS | FULLBACK HITS HOLE 9 YARDS |
| LONG PASS | PASS FLANKER 30 YARDS | WIDE RECEIVER TOUCHDOWN | LOSS 10 YARDS FUMBLE | KNOCKED DOWN PASS PENALTY | INTERCEPT 30 YARDS | SHORT PASS 10 YARDS |
| DRAW | STOPS DRAW LOSS 5 | OUTSIDE TACKLE 3 YARDS | DRAW BIG HOLE 15 YARDS | DRAW NO GAIN | MIDDLE BIG HOLE 12 YARDS | DRAW HALFBACK 5 YARDS |
| Q.B. SNEAK | KEPTS 1 YARD | THROUGH CENTER 4 YARDS | NO GAIN PENALTY | THROUGH CENTER 7 YARDS | DRAW KEPTS 10 YARDS | UP MIDDLE 15 YARDS |
| GADGET PLAYS | HANDOFF PASS TOUCHDOWN | LATERAL PASS 20 INTERCEPT | REVERSE LOSS 7 FUMBLE | PASS HALFBACK 23 YARDS | REVERSE LONG PASS TOUCHDOWN | PASS NO GOOD |
| END AROUND | 20 YARD RUN FUMBLE | REVERSE LOSS 2 | END AROUND LOSS 7 | END AROUND 6 YARDS | REVERSE 20 YARDS | END AROUND 9 YARDS |

INVENTOR
GORDON H. BUCK

BY [signature]

ATTORNEY

| | | | | | | |
|---|---|---|---|---|---|---|
| K.O.+PUNT. RETURN | AT THE 30 | AT THE 25 | AT THE 15 | AT THE 30 | FUMBLE LOSE 30 | FUMBLE 30 RECOVED |
| EXTRA POINT | NO GOOD 2 POINTS | GOOD | GOOD | NO GOOD | GOOD | GOOD 2 POINTS |
| INTERCEPT RUNBACK | GAIN 5 BACK TO 5 FROM LINE | INCOMPLETE | | INTERFERENCE GAIN 20 | RUNBACK T. D. | |
| PENALTY | GAIN 15 | | | LOSE 5 | | |
| FIELD GOAL | NO GOOD | GOOD | NO GOOD | GOOD | NO GOOD | GOOD |

INVENTOR
GORDON H. BUCK
BY [signature]
ATTORNEY

INVENTOR
GORDON H. BUCK

BY

ATTORNEY

AUDIBLE GAME

BACKGROUND OF THE INVENTION

This invention relates to game apparatus.

A wide variety of games have been designed for simulating strategy games or the like, such as the games of football and baseball and battles in a war. Many of such games allow one player to choose an offensive strategy by secretly choosing a card with the strategy printed thereon or turning a dial to a selected offense strategy. In such games, the defense player selects an opposing strategy by picking another card or rotating another dial to select the strategy he believes most effective to counter the expected offense strategy. Such games also include a device for matching the offense and defense strategy selections to designate an outcome that one would expect in the actual sport or the like that is simulated by the game.

The manner in which the strategies of the opposing players are matched and the manner in which the outcome is presented can have an important bearing on the entertainment value provided by the game. In some prior art games, the outcome is a tersely worded lable that appears through a window such as the word "touchdown" or a number representing a score. While such apparatus may be sufficient for highly serious adult players, the lack of exciting and stimulating sounds often associated with sports events can make such games boring to less serious players and particularly to children. Some game apparatus has been constructed to provide animations that increase the novelty and entertainment value. For example, one apparatus has been designed wherein a wheel that can rotate to provide a score, rotates rapidly to display many different scores prior to the finally selected score. However, the additional entertainment value of such devices has generally been minor.

SUMMARY OF THE INVENTION

In accordance with one embodiment of the invention, a game apparatus is provided that represents a spectator sport or other conflict situation of a type that would be likely to be reported on by a radio or television announcer. The game apparatus presents the outcome of each play in the form of a voice recording simulating that of an announcer who is describing the corresponding play or event in the spectator sport or real life conflict. The apparatus includes a plurality of phonograph records, each record having several tracks that contain voice recordings of an announcer describing the outcome of a play. Each record has a different label describing a different offensive strategy that can be chosen by a first player and each record also has several markings spaced thereabout describing different defensive strategies that can be chosen by a defensive player. The first player secretly chooses one of the records that he believes provides the best offensive strategy and inserts it into a phonograph. The second player chooses an initial rotational position of the record where a pointer on the phonograph housing points to the selected defensive strategy that the second player believes is most appropriate. The phonograph is then started, and the record groove that is played is one which is likely to be either favorable or unfavorable to the second player, depending on whether he has chosen a defensive strategy respectively appropriate or inappropriate to the offensive strategy defined by the record label.

Each of the records has several spiral groove tracks with the leadin portions circumferentially spaced about the record. The stylus of the phonograph moves against the record and enters the first leadin portion that it encounters, and thereafter plays that spiral groove. Every leadin portion is angularly spaced from one of the defense strategy markings on the record by approximately the same amount, so that the groove that is played is determined by the initial rotational position of the record. In order to add an element of chance, additional grooves are provided that define improbable outcomes. The leadin portions of these improbable outcome grooves are located close to the leadin portion of a probable groove and spaced in a downpath direction therefrom, so that there is only a small chance that one of the improbable grooves will be played. The voice announcement defined by each groove may describe the outcome in an excited manner with appropriate adjectives and descriptions of the reaction of a crowd, and may contain background noises such as cheering or hissing of a crowd to add realism and great entertainment value to the game.

The novel features of the invention are set forth with particularity in the appended claims. The invention will be best understood from the following description when read in conjunction with the accompanying drawings.

BRIEF DESCRIPTION OF THE DRAWINGS

FIG. 2 is a perspective view showing a first side of an optional record of the game apparatus of FIG. 1;

FIG. 4 is a chart showing the various major record grooves in each of several optional records in the apparatus of FIG. 1;

FIG. 11 is a perspective view of a phonograph apparatus and record designed for the simulated play of a baseball game.

DESCRIPTION OF THE PREFERRED EMBODIMENTS

Figures 1, 3, 12:
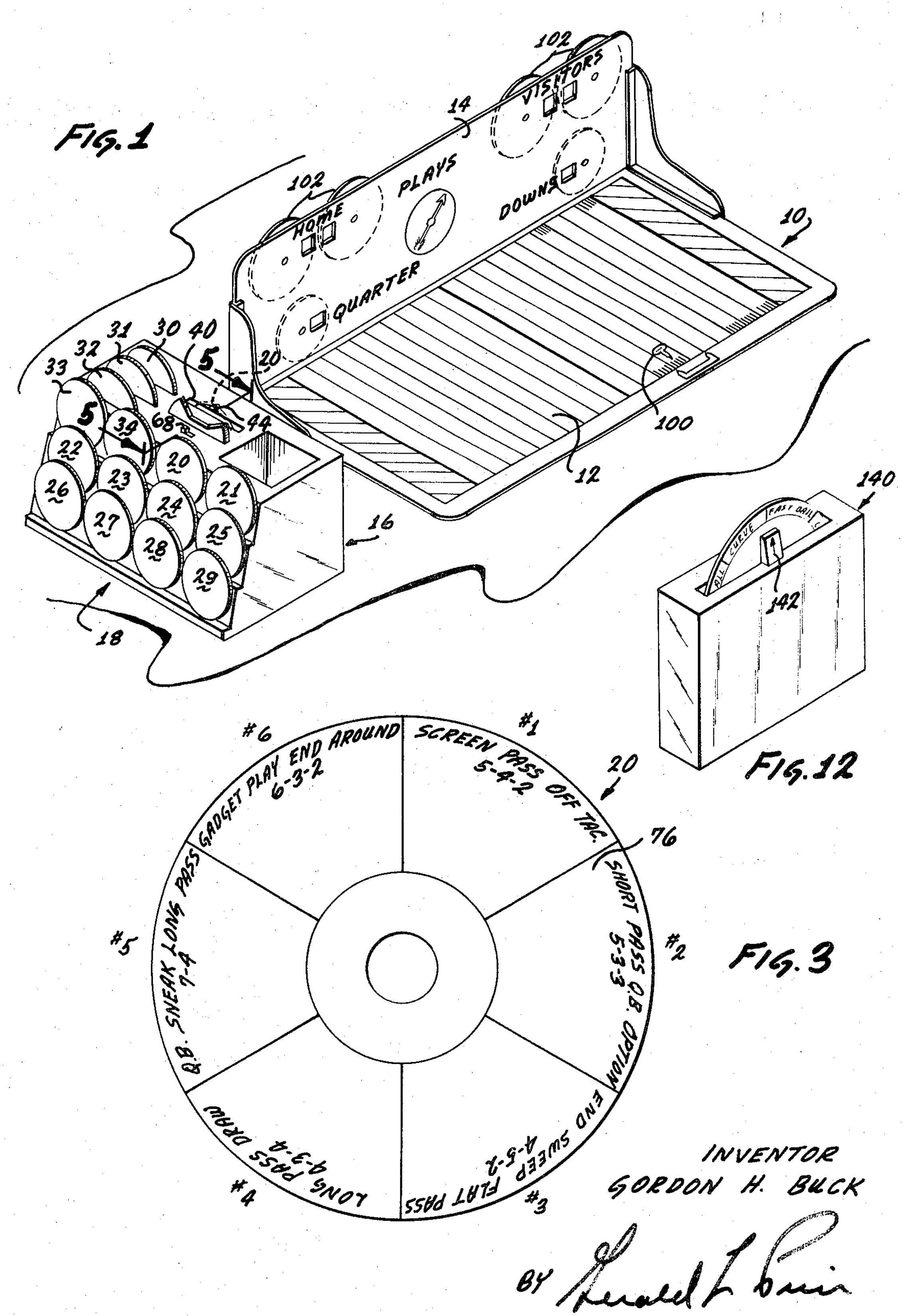
FIG. 1 is a perspective view of game apparatus constructed in accordance with the invention, which is designed to simulate play of a football game.
FIG. 3 is a plan view of a second side of the record of FIG. 2.
FIG. 12 is another perspective view of the phonograph apparatus and record of FIG. 11.

FIG. 1 illustrates a toy football game which includes a playing board 10 with a football field area 12 and scoreboard area 14, a phonograph mechanism 16, and a series of records 18 for play by the phonograph. The records may be considered to be divided into two groups, one group including ten records 20–29 that are optional records to be selected by one player and the other group including five records 30–34 that are mandatory records to be played in specifically defined situations.

The game apparatus may be utilized by two players who represent the opposing teams in an American type football game wherein each team attempts to advance a ball toward a goal of the opposite team. During a series of plays in the game apparatus, one player will represent the offense team which has possession of the football while the other player represents the defense team which does not have possession. To begin a play, the offense player chooses one of the ten optional records 20–29, each record bearing a label defining an offensive play strategy similar to the types of strategies used in actual football games. For example, one of the records 20 carries the label "Screen Pass" representing a strategy wherein the offensive team attempts to advance the football by throwing it a short distance to a receiver who is protected by a screen of blockers. The offense player inserts the selected record 20 into a slot 40 of the phonograph mechanism without letting his opponent see the label on the record.

Figures 5, 6:
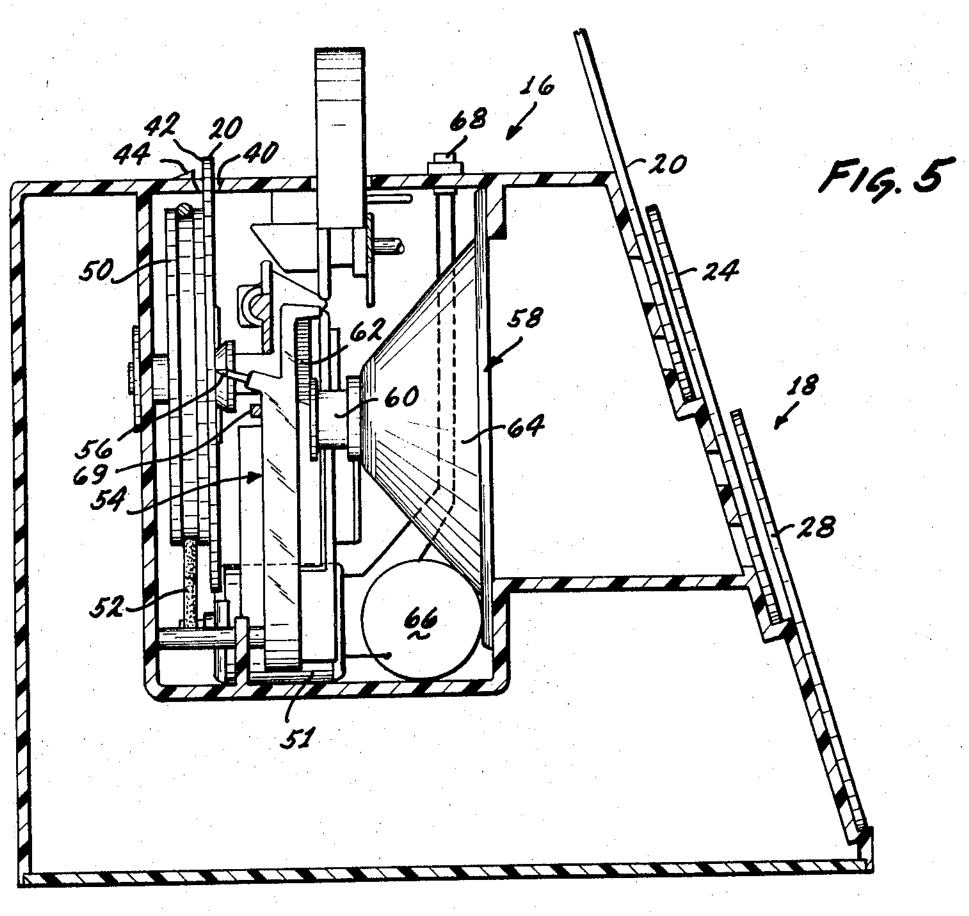
FIG. 5 is a view of the phonographc apparatus taken on the line 5—5 of FIG. 1.
FIG. 6 is a chart showing several mandatory records of the game apparatus of FIG. 1, and indicating the type of outcome defined by the grooves of each record.

As shown in FIG. 5, the phonograph is constructed so that an outer portion 42 of the record 20 projects from the slot 40 and can be seen by the defense player. Prior to playing the record, the defense player can turn the record 20 so that any one of several indicia on the outer portion 42 is lined up with a pointer 44 on the photograph. Of course, a window may be employed as a pointer means to indicate a particular defense strategy. Each of the indicia on the outer record portion 42 defines a different defense strategy or defense deployment that a defensive team might choose to use against an unknown offense strategy. After the defense player has selected the defense strategy by turning the record so that the selected strategy is opposite the pointer 44, the phonograph 16 is operated to play the record.

When the phonograph is played, a voice sound track is heard which is simulated report by a sports announcer who is describing the play in a football game, and whose description relates the outcome of the play. For example, the sound track might be the following: "It's a screen pass to the right end — he's driving hard and look at him go (background cheering of a crowd) — he's tackled by number 57 for a 12 yarn gain." The record has several different sound tracks, some describing outcomes favorable to the defense and some describing outcomes that are unfavorable. The particular sound track that is played depends to a large extent on the initial rotational position of the record, as will be described below, and therefore depends upon which defense strategy has been chosen by the defense player. A defense strategy choice which is highly appropriate to the offense strategy defined by the hidden record label, normally results in a record track being played which is highly favorable to the defense, while an inappropriate choice is likely to cause an unfavorable record track to be played.

At certain times during a football game, as during a kickoff or during a field goal attempt, the general strategy of each side cannot be selected. The five mandatory records 30–34 are provided to account for these situations. Each mandatory record has several sound tracks, some more favorable to the defense than others. However, the record is constructed so that the tracks are selected by chance. This is somewhat similar to chance devices utilized in prior art games, such as a spinner or dice, except that the outcome is related in a highly interesting manner in the form of a voice report that may include interesting descriptions and entertaining sound effects such as those of an excited crowd.

The phonograph 16 is of a type that includes a turntable 50 driven by an electric motor 51 coupled thereto by a belt 52, and a playing head 54 which includes a stylus 56 than can move against the record 20 on the turntable and follow along a record groove. Vibrations transmitted to the stylus 56 are accoustically amplified by a speaker assembly 58 that includes an armature 60 spring biased against a member 62 of the playing head, and which transmits vibrations to a speaker cone 64. The motor 51 can be energized by a battery 66 when a switch 68 is closed. A phonograph of this general type is described in patent application Ser. No. 100,250, filed on Dec. 21, 1970, entitled EASY LOADING TOY PHONOGRAPH By James H. Fox, et al., now U. S. Letters Pat. No. 3,666,274, issued on May 30, 1972, except for certain modifications including provision of the switch 68 to prevent energization of the motor until play is to begin and provision of a manually operable level 69 pivotally mounted on the phonograph housing to keep the stylus off the record until after the defense player has turned the record.

FIG. 2 illustrates the front or obverse side 70 of one of the optional records 20 showing the label 72 thereof which defines one offensive strategy. The record has six grooves designated "Groove No. 1" to "Groove No. 5", the Figure showing only the leadin portions of these grooves. The leadin portions are circumferentially spaced about the periphery of the record by about one-sixth of a turn, or about 60°. The leadin portions lead to the rest of the tracks which extend in parallel multi-turn spirals. The record is designed to rotate in the direction of arrow 74 during play. Prior to rotation of the record, the stylus 56 will bear against a peripheral portion of the record, and when record rotation begins the stylus will enter the first leadin groove portion it encounters. In FIG. 2 a stylus at 56 would enter groove No. 2 and therefore play that groove. Thus, the initial rotational position of the record determines which groove is played.

The reverse side 76 of the record is shown in FIG. 3. The reverse side has six defense strategy descriptions indicated by the numerals No. 1 through No. 6. These indicia are circumferentially spaced about the record, and therefore there is a correspondence between each defense indicia on the reverse side 76 and the location of each leadin groove portion on the obverse side 70. When a particular defense indiciation such as the indication No. 2 is selected, by positioning the record with the indication No. 2 opposite the phonograph pointer 44, the phonograph stylus 56 is positioned to enter the corresponding groove No. 2. In the case of the record 20 whose front surface contains a label 72 describing an offense strategy of "Screen Pass" the selection of defense strategy No. 2 is fairly appropriate but not highly appropriate. Accordingly, groove No. 2 which is played when defense strategy No. 2 is selected, defines an outcome which is favorable to the defense but only partially so. For example, the groove No. 2 may define an announcement such as "He is dropping back — it's a short pass off the left tackle — number 89 knocks it down — incomplete." If the defense player had chosen defense number 1 so that groove No. 1 were played, then he might cause a track to be played that described an outcome highly favorable to the defense, while an inappropriate defense such as No. 4 would play groove No. 4 which describes an outcome highly unfavorable to the defense. Of course, different optional records have labels that describe different offense strategies.

Each optional record has a different label describing a different offense, and for each record a different defense strategy must be chosen to obtain a highly favorable outcome. In the case of the football game of FIG. 1, 10 optional records ar provided which describe the following ten offense strategies: SCREENPASS, OFF TACKLE, SHORT PASS, Q.B. OPTION, END SWEEP, LONG PASS, DRAW, Q.B. SNEAK, GADGET PLAYS, and END AROUND. Each record may have the same size six defense strategies printed on the reverse side and may contain any number of corresponding grooves on the obverse side. It should be noted that it is not necessary to provide a separate groove for each defense strategy, inasmuch as some outcomes of a play may be appropriate for more than one offense-defense strategy combination, and conversely, two or more grooves may be provided for each offense-defense strategy combination. In addition, unlikely but possible outcomes may be provided by the use of individual additional tracks, as will be described below.

Figure 7:
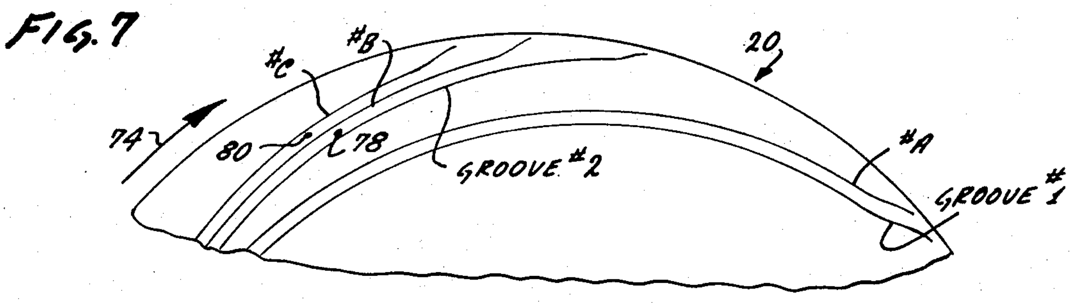
FIG. 7 is a partial plane view of the optional record of FIG. 2, showing the arrangement of leadin groove portions thereof.

In order to add additional realism and excitement to a simulated game, additional record tracks may be provided which define improbable outcomes of a particular defense strategy. FIG. 7 illustrates a portion of the record 20 of FIG. 2 in greater detail, showing not only the probable grooves No. 1 and No. 2 which define probable outcomes, but also grooves No. A, No. B and No. C which define less probable or improbable outcomes. For example, groove No. B may describe an outcome wherein the football is fumbled and recovered by the defense team while groove No. C may describe an outcome wherein the offense team makes a touchdown. It is desirable that there be only a small chance of any one of the improbable outcome tracks being played, as compared to the chance of one of the probable outcome tracks. To provide for this, the leadin portions of the improbable outcome tracks such as No. A are closely spaced downpath from the probable outcome tracks such as No. 1, the downpath direction being the direction opposite to the direction of record rotation indicated by arrow 74. The spacing of an improbable track downpath from a probable track should be less than one-half the spacing of probable tracks from each other; i.e. less than 30° in the case of the above-described records. If the stylus of the phonograph should initially move onto the record at the point 78, the groove No. B will be played, while if the stylus should initially move onto the record at point 80, the groove No. C would be played. There is only a small chance that the stylus will initially fall near point 78 or point 80, and there is a much greater chance that the stylus will fall in the large region between groove No. 2 and groove No. A, and therefore play the groove No. 2.

Figure 8:
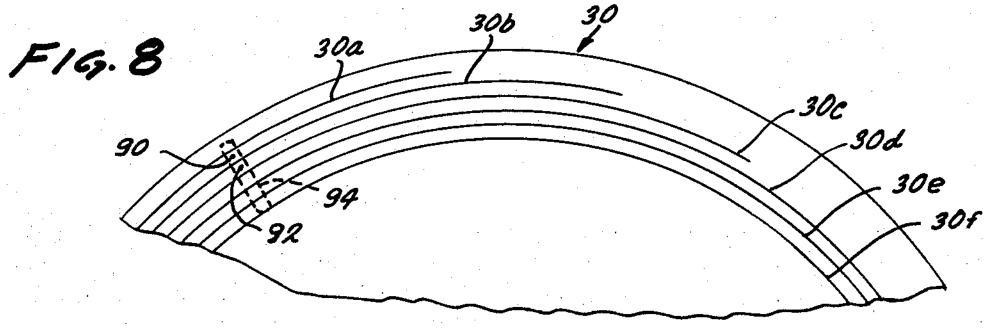
FIG. 8 is a partial plan view of a mandatory record, showing the arrangement of leadin grooves thereof.

In some situations during a football game, the offense does not have a wide option as to strategy, so that there is not a wide choice of defense strategy. For example, the results of a kickoff and return or of a field goal attempt may not be largely dependent upon the defense strategy. Although spinners, dice, and other chance-determining devices could be utilized, additional entertainment is provided by utilizing voice recordings even in determining the outcomes of such mandatory plays. Of course, the records in these cases must be constructed so that the players cannot determine the outcome by choosing the initial rotational position of the record. FIG. 8 is a partial illustration of a mandatory record 30 which defines the outcome of a kickoff-punt return play. The record has six grooves labeled 30*a*–30*f*. The leading portion of each groove on the mandatory record has a small angle of spiral (it extends almost like a circle) equal to hat of the rest of the groove, so that a slight variation in the initial radial position of the stylus 56 can result in a different groove being played. Thus, if the initial stylus position is at point 90 the groove 30*a* will be played while if the initial position is point 92 the groove 30b will be played. The phonograph is constructed with loose enough tolerances so that there is a range of positions, such as in the region 94, where the stylus can initially contact the record. Accordingly, the groove to be played is primarily chosen at random and independently of the initial angular position of the record.

For a football game apparatus, five mandatory records may be provided which have the following self-explanatory labels K.O.-PUNT RETURN, EXTRA POINT, INTERCEPT-RUN BACK, PENALTY, and FIELD GOAL. The voice recordings for the K.O.-PUNT RETURN record may have four tracks describing the ball returned to various yard lines or may describe a fumble and recovery or a fumble and loss at different yard lines. The extra point record may describe whether the play was good or not, although different tracks may describe this in different interesting ways. The INTERCEPT RUNBACK record may describe such outcomes as an interference being called, a runback touchdown, an incomplete, or a particular yardage gain. The PENALTY record may describe a fifteen yard gain of five yard loss, although if several tracks are employed then different descriptions and crowd reactions may be described. Similarly, the Field Goal record may merely describe whether an attempt was good or not good, but may utilize interesting language, including side comments and crowd reactions.

In the play of the football game, the players can utilize the field and scoreboard apparatus shown in FIG. 1, as by moving a ball marker 100 to keep track of the ball position on the field and rotating dials 102 to keep track of scores and the like.

While the record and phonograph apparatus has been described for use in a simulated football game, similar apparatus can be provided for playing other games such as a simulated baseball game. In a simulated baseball game, the label on the front side of each record may denote a type of pitch, such as a fast ball, curve ball or other pitch. The reverse side may have several markings spaced thereabout denoting expected pitches. The record tracks may describe the type of pitch, how it was hit (or missed), and the outcome such as a strike, ball, out, single, home run, etc. Of course, the leadin portions of the tracks would be correlated with the portions of the reverse-side markings.

Figure 9:
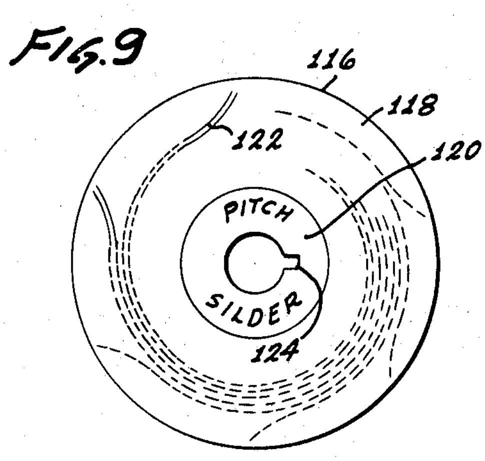
FIG. 9 is a plan view of a first side of a record which is designed for the simulated play of a baseball game.
Figure 10:
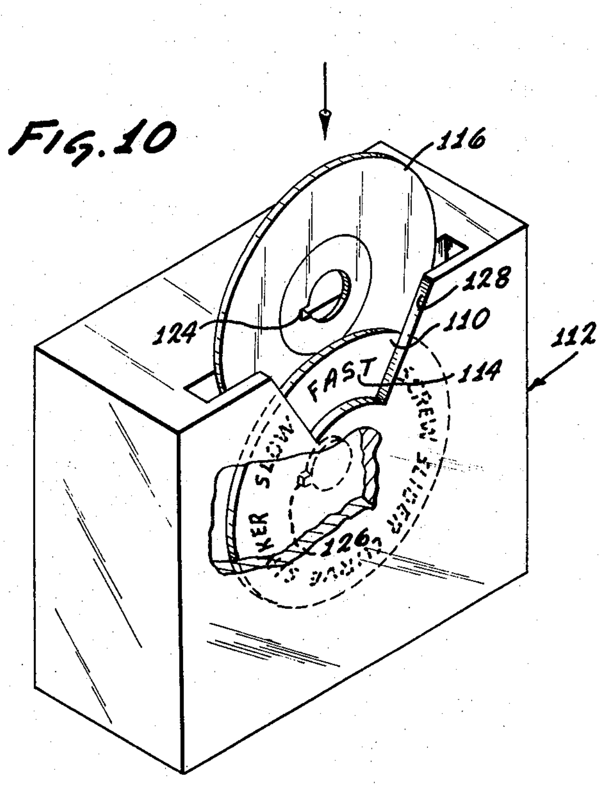
FIG. 10 is a perspective view of game apparatus constructed in accordance with another embodiment of the invention, and illustrates a second side of the record of FIG. 9.

Although the defense strategy descriptions, have been described as located on the records, they can be located on the phonograph turntable or a wheel that moves with it. FIGS. 9 and 10 illustrate apparatus for a simulated baseball game wherein the turntable 110 of the phonograph 112 has defense strategy markings 114 thereon, instead of such markings being located on each record. The record 116 has a forward side 118 with a label 120 describing a pitch and with grooves 122 defining voice recordings describing a play. The reverse side of the record is blank. The record can be inserted into the phonograph to lie on the turntable 110 thereon. The record has a key-receiving portion 124 that receives a key 126 on the turntable to correlate their positions. The defense player turns the record and turntable until a selected one of the turntable markings 114 can be seen in a window 128 formed in the phonograph. He then starts the phonograph to hear the results of the play, such as: "The pitch is low and outside — strike called and he doesn't like it (Crowd Booing)."

FIGS. 11 and 12 illustrate another baseball game apparatus wherein a plurality of records 130 are provided that correspond to particular imaginary members of a baseball team. Each record carries the name of a team member 134, the batting average of the team member 136, and an arrow 138 on its front face 139. The offense player places the record in a phonograph 140 that has a turntable 142 carrying baseball pitch designations along its periphery. The offense player installs the record with the arrow 138 pointing to an expected pitch, such as a "Fast Ball", as shown in FIG. 11. The defense player, who sees only the back of the phonograph 140, as shown in FIG. 12, rotates the turntable with the record thereon, to choose a pitch. The defense player turns the turntable so that the chosen pitch such as a "Slow Ball", lies opposite a pointer 142 on the phonograph. The phonograph is then turned on.

When the phonograph is turned on, a recording is heard which describes the outcome of the play, such as, "Smith hits a grounder to center field — over to first and out," or "It's high and outside for a ball." When the defense player chooses a pitch which is the same or which is similar to the pitch chosen by the offense player, the phonograph needle is likely to enter a record track that describes an outcome favorable to the offense. A dissimilar choice is likely to result in an outcome unfavorable to the offense. The phonograph record of a team member with a higher batting average contains tracks which are move favorable in number or in degree of favorableness than the records for team members with a lower batting average. The offense player can arrange his team batting order and make substitutions to increase his chance of winning, in a manner similar to a manager of a real baseball team.

Thus, the invention provides game apparatus wherein the outcome of a series of plays is presented in a highly entertaining manner. This is accomplished by providing phonograph records with record tracks that contain voice recordings simulating that of an announcer describing the outcome. The record and phonograph apparatus is constructed so that it can be utilized in strategy games wherein opposing players choose strategies, and the particular record track that is played is a result of the comparative strategies. By correlating the outcomes played on the record with the outcomes that would be most probable in the sport or conflict situation simulated by the game, each player is able to exercise his knowledge about the sport or conflict situation to try to beat an opponent in the simulated game. The game apparatus can be constructed for simulating a wide variety of spectator sports such as boxing, ice hockey, and soccer where announcers may be present to describe the outcomes, or even in sports where announcers normally are not present. The game apparatus can simulate other conflict situations besides sports, such as battles or diplomatic maneuvering, and in these cases the outcomes may be in the form of news broadcasts. The high entertainment value of professionally recorded voice announcements adds excitement to the determination of outcomes so as to greatly enhance the games.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A record game for use with a phonograph that selects one of several record tracks on a record in accordance with the initial positions of the record, comprising:

a plurality of records, each having a label defining a different first play strategy by a first player, each record having a plurality of respeonse indications spaced about the record and defining different second strategies that can be chosen by a second player to respond to expected first play strategies and each having a plurality of record tracks which define different outcomes of plays involving the play strategy indicated on the record label and the chosen response strategy indicated by the chosen response indication, said record tracks having leadin portions spaced thereabout so that the particular recording that will be played by the phonograph depends upon the initial record rotational position chosen by the second player;

said record tracks include a plurality of probable outcome tracks defining probable outcomes resulting from the choice of corresponding second strategy responses defined by said response indications, and each of the leadin portions of said plurality of probable outcome tracks spaced from the corresponding response indication by substantially the same predetermined distance, so that when a highly appropriate or inappropraite second strategy response is chosen an outcome respectively favorable or unfavorable to the second player is sounded when one of said probable outcome tracks is played; and each record has a plurality of improbable outcome tracks with leadin portions interleaved with the leadin portions of said first tracks, each of said improbable outcome tracks relating an outcome which is less likely than the outcome of the probable outcome track that has a leadin portion closest in an up-path direction relative to the normal direction of record rotation, said improbable track spaced from the corresponding probable track by less than half the average spacing of said probable outcome tracks from one another about said record, whereby outcomes are occasionally related that are unusual for the selected pair of first and second strategies.

* * * * *